(12) United States Patent
Dueckinghaus et al.

(10) Patent No.: US 7,726,107 B2
(45) Date of Patent: Jun. 1, 2010

(54) HYDRAULIC SYSTEM FOR A SELF-PROPELLED HARVESTING MACHINE

(75) Inventors: Heinrich Dueckinghaus, Bielefeld (DE); Norbert Strieker, Verl (DE); Dirk Schlichting, Paderborn (DE); Guenter Eis, Harsewinkel (DE)

(73) Assignee: CLAAS Selbstfahrende Ernstemaschinen GmbH, Harsewinkel (DE)

( * ) Notice: Subject to any disclaimer, the term of this patent is extended or adjusted under 35 U.S.C. 154(b) by 746 days.

(21) Appl. No.: 11/567,048

(22) Filed: Dec. 5, 2006

(65) Prior Publication Data
US 2007/0130898 A1 Jun. 14, 2007

(30) Foreign Application Priority Data
Dec. 9, 2005 (DE) .................. 10 2005 059 351

(51) Int. Cl.
*A01D 69/00* (2006.01)
(52) U.S. Cl. ...................................... 56/11.9

(58) Field of Classification Search .............. 56/10.2 R, 56/10.2 D, 10.2 E, 10.2 F, 10.2 G, 10.2 H, 56/10.3, 10.4, 11.9, 208, 10.9; 172/2–11; 37/348, 466, 468; 701/50
See application file for complete search history.

(56) References Cited

U.S. PATENT DOCUMENTS

| 5,419,129 | A | 5/1995 | Becker et al. |
| 5,577,373 | A * | 11/1996 | Panoushek et al. ........ 56/10.2 E |
| 6,615,570 | B2 * | 9/2003 | Beck et al. ................ 56/10.2 E |
| 6,813,873 | B2 * | 11/2004 | Allworden et al. ........ 56/10.2 E |
| 6,834,223 | B2 * | 12/2004 | Strelioff et al. ................ 701/50 |

FOREIGN PATENT DOCUMENTS
DE 43 11 191 10/1994

* cited by examiner

*Primary Examiner*—Robert E Pezzuto
(74) *Attorney, Agent, or Firm*—Michael J. Striker

(57) ABSTRACT

A hydraulic system for an agricultural working machine composed of a carrier vehicle and at least one adapting device has one or more hydraulically driven consumer included in each of the carrier vehicle and the at least one adapting device, and a common hydraulic pressure line, wherein the consumers are connected to the common hydraulic pressure line, and a constant hydraulic pressure is applied to the common hydraulic pressure line.

18 Claims, 2 Drawing Sheets

HYDRAULIC SYSTEM FOR A SELF-PROPELLED HARVESTING MACHINE

CROSS-REFERENCE TO A RELATED APPLICATION

The invention described and claimed hereinbelow is also described in German Patent Application DE 10 2005 059 351.8 filed on Dec. 9, 2005. This German Patent Application, whose subject matter is incorporated here by reference, provides the basis for a claim of priority of invention under 35 U.S.C. 119(a)-(d).

BACKGROUND OF THE INVENTION

The present invention relates to a hydraulic system for a self-propelled harvesting machine.

Publication DE 43 11 191 makes known a tractor with a tractor hydraulic system based on load sensing, with which the consumers on the tractor are supplied hydraulically. With these hydraulic systems, the pressure at the consumer is communicated to the hydraulic pump of the hydraulic system. The hydraulic pump changes its pump capacity depending on the pressure at the consumer in order to provide only what is required. In contrast, the combine-mounted device to be connected to the tractor has a constant-pressure system which requires a constant pressure to operate the hydraulic functions of the combine-mounted device.

The disadvantage of this known combination of tractor and combine-mounted device is that an interface is required between the hydraulic system of the tractor and the hydraulic system of the combine-mounted device, which transmits the pressure at the hydraulic function of the combine-mounted device to the hydraulic pump, so that it also functions with an optimal operating pressure when a combine-mounted device is attached.

SUMMARY OF THE INVENTION

Accordingly, it is an object of the present invention to provide a hydraulic system for a self-propelled harvesting machine which avoids the disadvantages of the prior art.

More particularly, it is an object of the present invention to provide a standard, simple hydraulic system for the consumers on a carrier vehicle and for the consumers on an adapting device capable of being coupled to the carrier vehicle, which has a high reaction speed and low tendency to oscillate when the dynamics of the consumer are high, and which has high efficiency.

In keeping with these objects and with others which will become apparent hereinafter, one feature of the present invention resides, briefly stated, in a hydraulic system for an agricultural working machine composed of a carrier vehicle and at least one adapting device, comprising one or more hydraulically driven consumers included in each of the carrier vehicle and the at least one adapting device; and a common hydraulic pressure line, said consumers being connected to said common hydraulic pressure line, and a constant hydraulic pressure is applied to said common hydraulic pressure line.

Given that the consumer(s) are connected to a common hydraulic pressure line, and constant hydraulic pressure is applied to the pressure line, the result is a standard, simple hydraulic system for the consumers on a carrier vehicle and the consumers on a front attachment which can be coupled with the carrier vehicle.

Advantageously, at least one consumer of the carrier vehicle and/or the adapting device runs through a switching cycle which is rapid compared to that of the other consumers. The constant hydraulic pressure in the hydraulic system makes possible a high reaction speed and low tendency to oscillate when the dynamics of the consumer are high.

In an advantageous embodiment of the present invention, the at least one consumer which runs through a rapid switching cycle is designed as a ground-surface adaptation device which can swivel the adapting device transversely to the direction of travel and/or longitudinally in the direction of travel, so that the adapting device is guided with a defined cutting height as it adapts to the ground surface.

In a further advantageous embodiment of the present invention, the ground-surface adaptation device includes several hydraulic cylinders. At least one electromagnetically switchable control valve is located between at least one hydraulic cylinder and the pressure line, so that the hydraulic cylinder is acted upon with pressure via the pressure line, or it is blocked off from pressure from the pressure line, or it is opened to the tank, so it can be depressurized.

Given that the control valve is switched depending on a ground level, the hydraulic cylinders are extended or retracted such that the front attachment is oriented toward the slope of the ground.

A particularly simple design of the present invention results when the ground level is sensed with at least one probe which generates at least one distance signal depending on the ground level and transmits it to a control unit, thereby making it possible to easily detect the ground level.

When the control unit generates signals depending on the distance signals and transmits the signals to the control valve (s), the control valves are actuated automatically.

A particularly cost-favorable and operationally reliable design of the present invention results when the electromagnetic control valve is designed as a poppet valve.

Given that a pressure reduction valve is located between the consumer and the pressure line, the pressure can be reduced to a level which is the maximum permissible pressure for at least one consumer.

Fewer lines are required for the hydraulic system when the control valves are integrated in the pressure line close to the associated consumers on the carrier vehicle or the front attachment. This layout of control valves also shortens the reaction time for controlling the consumers.

A particularly simple hydraulic system without any pressure-reduction valves is possible when at least some of the hydraulic cylinders are designed for a pressure range.

A particularly simple and, therefore, cost-favorable design of the present invention results when the constant pressure is generated by a pressure-controlled, variable-displacement pump which is connected with the pressure line.

The variable-displacement pump is advantageously designed as a variable-capacity pump; the pump capacity can be regulated depending on the pressure in the pressure line or an electrical control device, so that the pump capacity of the variable-displacement pump can be easily controlled.

Given that the variable-displacement pump is driven by an internal combustion engine and the variable-displacement pump is depressurized when the internal combustion engine is started, the starting torque of the engine is not increased by the hydrostatic torque of the variable-displacement pump.

In a further embodiment of the present invention, an electrically controllable directional control valve is assigned to the variable-displacement pump, and, after the internal combustion engine is started, the directional control valve is switched such that the variable-displacement pump generates the hydraulic pressure in the pressure line, so that the hydraulic energy is available for the consumers immediately after the internal combustion engine is started.

In a further embodiment of the present invention, the agricultural working machine includes as least one variator, the reduction ratio of which can be adjusted with the consumer, so that the rotational speed of the working units on the carrier vehicle and/or the front attachment can be regulated permanently with the constant pressure from the pressure line.

Advantageously, an emergency control pump is assigned to the agricultural working machine, which locks in an "out of service" position when a working pressure is applied, and which is switched to an operating position when the working pressure drops, thereby ensuring that the working machine be steered even if the variable-displacement pump fails.

An advantageous embodiment of the present invention results when the piston of the emergency control pump in the operating position is operatively connected with a wheel-driven cam, and the rotary motion of the cam induces pumping action of the emergency control pump, so that the kinetic energy of the rotating drive wheels is used to operate the emergency control pump.

A hydraulic motor is advantageously located in the pressure line; the hydraulic motor drives a blower in a rotational manner, which allows the blower to function as a current regulator.

The novel features of the which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
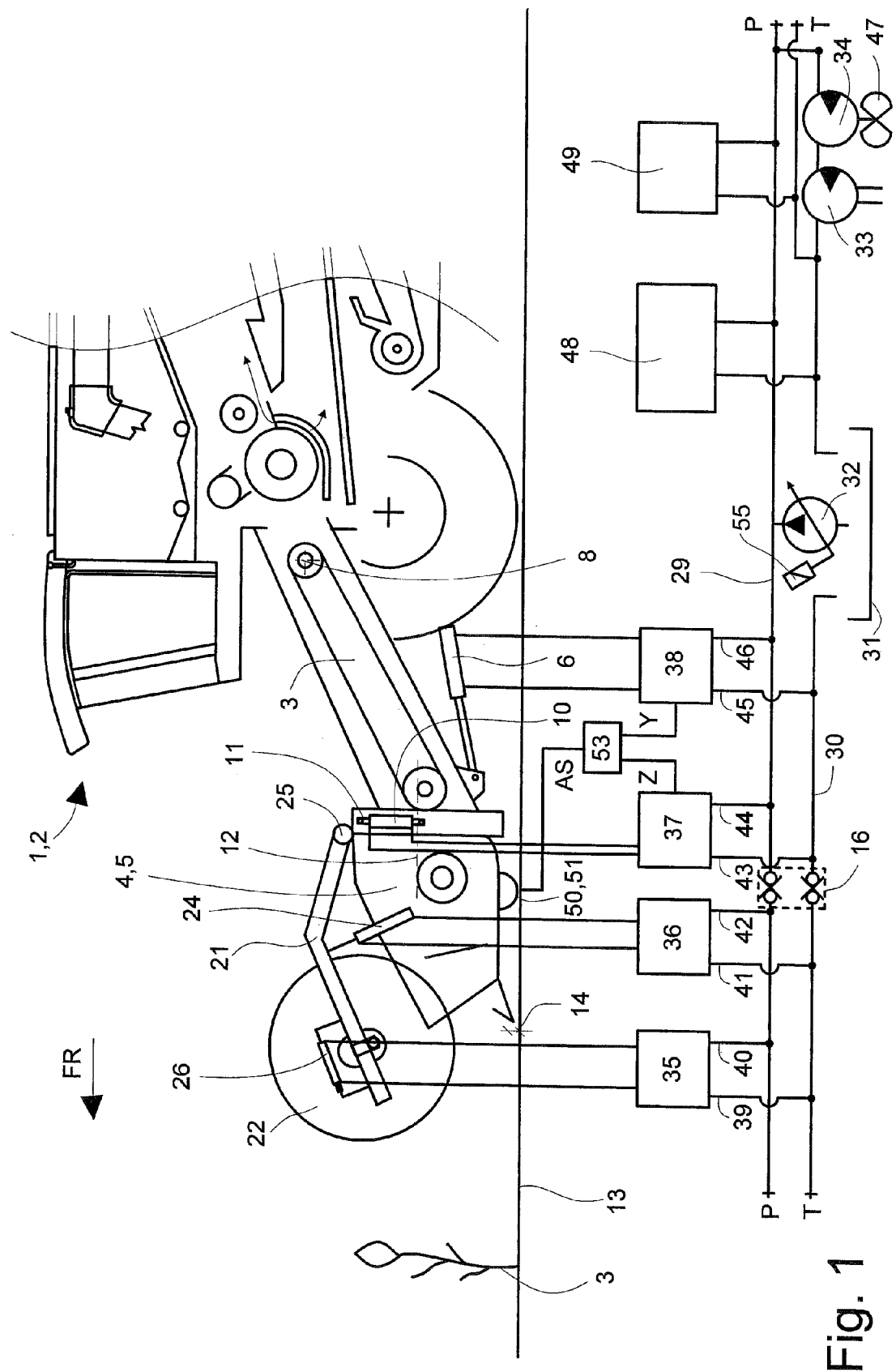
FIG. 1 shows a schematic side view of a combine harvester with an inventive hydraulic system.

An agricultural working machine 2 designed as a self-propelled combine harvester 1 is shown in FIG. 1 during the harvesting operation, in a side view.

Combine harvester 1 includes a feed rake 3 on the front, to which a front attachment 5 designed as a header 4 is attached.

Feed rake 3 is guided in a vertically displaceble manner around a pivot axis 8 located transversely to the direction of travel FR via hydraulic cylinders 6 which, on the base side, are pivotably connected to consoles of carrier vehicle 1 and which, on the piston rod side, are pivotably connected to feed rake 3. In addition, essentially vertically oriented hydraulic cylinders 10 are assigned to both sides of feed rake 3 in its front region, the piston rods 11 of which are hingedly coupled at their free ends with the rear region of front attachment 5.

When pressure is applied to or relieved from related hydraulic cylinder 10, header 4 pivots around a central axis 12 pointing in the direction of travel of combine harvester 1, transversely to direction of travel FR of combine harvester 1. Hydraulic cylinder 6 and hydraulic cylinder 10 are components of ground-surface adaptation device 15—which will be described in greater detail, below—with which header 14 is guided at a defined cutting height 14 relative to ground, depending on current ground level 13, during the harvesting operation; this results in uniform stubble height on a harvested field.

Header 4 is composed of a cutting table 20 and two reels 22 mounted on two vertically displaceable reel support arms 21 on cutting table 20. Reel 22 ensures that crop material is drawn in continually and is guided evenly through header 4. The vertical position of reel 22 is based on the height and density of the crop material on the field, and is set by the operator, e.g., depending on cutting height 14. To adjust the reels, two hydraulic cylinders 24 are hingedly connected between cutting table 20 and reel support arms 21, with which reel support arms 21 can be swiveled around a pivot point 25 in a rotating manner, thereby changing the vertical position of reel 22. Two additional hydraulic cylinders 26 are installed between reel support arms 21 and reel 22, with which the position of reels 22 is adjusted in the horizontal direction relative to cutting table 20.

Crop material 23 is cut using header 4, and cut crop material 23 is transferred to feed rake 3, which transfers the crop material to working units 27—which are known and will therefore not be described in greater detail here—in machine housing 28 of combine harvester 1.

Hydraulic cylinder 6 which is hingedly mounted on combine harvester 1 and serves to offset the longitudinal tilt of header 4, hydraulic cylinder 10 which serves to tilt header 4 transversely, hydraulic cylinder 24 which is hingedly mounted on front attachment 5 and serves to adjust the height of reel 22, and hydraulic cylinder 26 which serves to horizontally adjust reel 22 are connected to a hydraulic pressure line 29 according to the present invention and in a manner to be described in greater detail below, hydraulic pressure line 29 being acted upon with a constant hydraulic pressure D. To this end, pressure line 29 guided through combine harvester 1 is connected with the pressure side of a pressure-regulated, variable-displacement pump 32 which applies pressure to pressure line 29. Variable-displacement pump 32 generates a constant pressure, which is approximately 180 to 230 bar. Pressure line 29 is advantageously made of metal tubing, so that thermal energy from the hydraulic fluid is also dissipated to the surroundings via pressure line 29.

Additional consumers 48, 49 can also be connected with pressure line 29 in the same manner as ground-surface adaptation device 15 and hydraulic cylinders 24, 26. These consumers can be, e.g., the control cylinders of a steerable rear axle of the combine harvester, the automatic steering device of the combine harvester, or the hydraulic cylinders used to adjust the position of a distributing device on the combine harvester. The inventive hydraulic system can be expanded in any manner.

The consumers, which are designed as hydraulic cylinders, can also serve to adjust a variator. The reduction ratio of the variator can be adjusted with the hydraulic cylinder, e.g., to adapt the rotational speed to working units known per se, such as a cylinder of combine harvester 1 or reel 22 on header 4.

In the exemplary embodiment shown, hydraulic motors 33, 34 are also located in pressure line 29. Hydraulic motor 34 drives a blower 47 in a rotary manner, for example.

Electromagnetically actuated control valves 35, 36, 37, 38 are switched between hydraulic cylinders 6, 10, 24, 26 and pressure line 29. Each of the control valves 35, 36, 37, 38 is connected separately via branches 39, 40, 41, 42, 43, 44, 45, 46 with pressure line 29 and a return line 30. The return line empties into a tank 31. A quick coupling 16 is located inside pressure line 29 and return line 30, so that front attachment 5 can be hydraulically decoupled, e.g., when front attachment 5 is replaced.

Control valves 35, 36 are actuated, in a manner known per se, depending on an operating command from the operator of combine harvester 1.

Control valves 37, 38 associated with ground-surface adaptation device 15 are switched automatically, either manually or depending on current ground level 13 below header 4. To this end, probes 50 are positioned below header 4 transversely to direction of travel FR and separated from each other. Probes 50 sense ground level 13 and, depending on current ground level 13, generate distance signals AS which are transmitted to a control unit 53 connected with probes 50. Depending on ground profile 13, control unit 53 generates signals Y, Z which are transmitted to control valves 37, 38, by way of which header 4 is guided in a manner such that it is adapted to the ground. Ground-surface adaptation device 15 runs through a rapid switching cycle compared to that of the other consumers 22, 26.

Consumers 6, 10, 24, 26 connected to pressure line 29 are designed for a pressure range which nearly corresponds to constant pressure D of variable-displacement pump 32. Consumers designed for a lower pressure range can also be connected to pressure line 29 via a pressure-control valve, to reduce constant pressure D to the maximum permissible operating pressure for the consumer. Control valves 35, 36, 37, 38 are integrated in the pressure line near associated consumers 6, 10, 24, 26, by way of which the connecting lines between control valves 35, 36, 37, 38 and consumers 6, 10, 24, 26 can be designed as short as possible.

Variable-displacement pump 32 is driven by an internal combustion engine located on combine harvester 1. The internal combustion engine can also drive, e.g., a hydraulic pump of a ground drive of combine harvester 1 and further hydraulic pumps of further hydraulic circuits in combine harvester 1. If the hydraulic pump for the ground drive fails, a supply-oil flow could be removed briefly from the inventive hydraulic system for emergency operation and supplied to the hydraulic circuit for the ground drive.

Variable-displacement pump 32 is depressurized before the internal combustion engine is started so that the starter does not have to also overcome the hydrostatic torque of the pressurized variable-displacement pump 32 when it starts the internal combustion engine. This can take place by the fact that variable-displacement pump 32 is adjusted to a low stand-by pressure via pressure regulator 55. After the starting procedure, pressure regulator 55 is adjusted such that variable-displacement pump 32 produces hydraulic working pressure D in pressure line 29, so that the hydraulic energy is available for consumers 6, 10, 24, 26 immediately after start-up. It is also possible to short-circuit pressure line 29 and tank 31 when the internal combustion engine is started up, or to mechanically decouple variable-displacement pump 32 from the internal combustion engine.

Variable-displacement pump 32 is designed as a variable-capacity pump with adjustable pump capacity, with which the pump capacity can be regulated depending on the pressure at the inlet side of pressure line 29 or an electrical control device, so that the pump capacity of variable-displacement pump 32 can be easily controlled.

Figure 2:
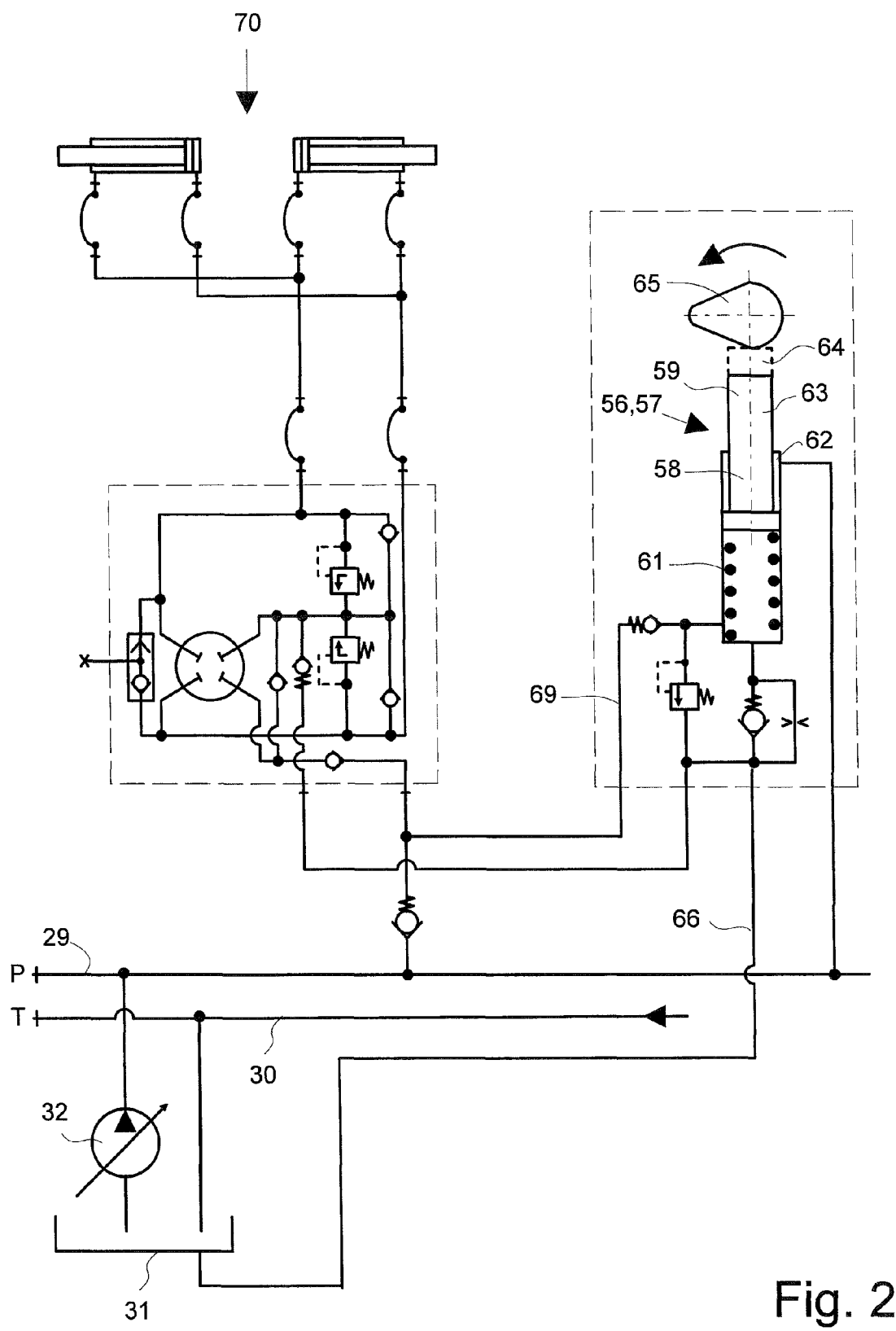
FIG. 2 shows a section of an inventive hydraulic system with an emergency control pump and a steering device.

FIG. 2 shows a section of an inventive hydraulic system with an emergency control pump 56. Emergency control pump 56 is composed of a dual-action hydraulic cylinder 57 with a piston 58 with two-sided piston rod 59; a compression spring 61 is located on the underside of piston 58, which serves to reset piston 58. Pressure is applied to upper piston rod space 62 of hydraulic cylinder 57 via inlet side 30 of pressure line 29, and it holds piston 58 in an out-of-service position 63 against the spring force of compression spring 61.

When pressure in pressure line 29 drops, piston 58 is extended via spring force F to an operating position 64.

In this operating position 64, piston rod 59 of piston 58 is operatively connected with a rotationally driven cam 65, which displaces piston 58 periodically back into out-of-service position 63, thereby inducing pumping action. Rotating cam 65 is driven, e.g., by the rotating wheels of the driven combine harvester. Via the to and fro motion of piston 58, hydraulic cylinder 57 draws a fluid flow out of tank 31 and into lower piston rod space 68 via intake line 66. When piston 58 is moved into out-of-service position 63, the pumped flow drawn into lower piston rod space 67 is pumped via a pump line 69 to a consumer 70 connected to pressure line 29. Advantageously, this is the steering device of the combine harvester, so that the combine harvester can be maneuvered even if variable-displacement pump 32 fails.

The inventive agricultural working machine can also be designed as a self-propelled forage harvester, to the front region of which a front attachment designed, e.g., as a corn header or a pickup, is assigned.

It is within the scope of the ability of one skilled in the art to modify the exemplary embodiments described in a manner not presented, or to use them in other machines to achieve the effects described, without leaving the framework of the invention.

It will be understood that each of the elements described above, or two or more together, may also find a useful application in other types of constructions differing from the type described above.

While the invention has been illustrated and described as embodied in a hydraulic system for a self-propelled harvesting machine, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristic of the generic or specific aspects of this invention.

The invention claimed is:

1. A hydraulic system for an agricultural working machine composed of a carrier vehicle and at least one adapting device, comprising
   a plurality of hydraulically driven consumers included in each of the carrier vehicle and the at least one adapting device;
   a common hydraulic pressure line, wherein said plurality of consumers are connected to said common hydraulic pressure line, and a constant hydraulic pressure is applied to said common hydraulic pressure line; and
   a pressure-controlled, variable-displacement pump connected with said common hydraulic pressure line for generating the constant hydraulic pressure.

2. A hydraulic system as defined in claim 1, wherein at least one of said consumers selected from the group consisting of a consumer of the carrier vehicle, a consumer of the adapting device, and a consumer of both, is configured so that at least one consumer runs through a switching cycle which is rapid compared to that of the other of said consumers.

3. A hydraulic system as defined in claim 2, wherein said at least one consumer which runs through the switching cycle is configured as a ground-surface adaptation device that swivels the adapting device in a direction selected from the group consisting of transversely to a direction of travel, longitudinally in a direction of travel, and both.

4. A hydraulic system as defined in claim 3, wherein said ground-surface adaptation device includes several hydraulic cylinders; further comprising at least one electromagnetically switchable control valve located between at least one of said hydraulic cylinders and said common hydraulic pressure line.

5. A hydraulic system as defined in claim 4, wherein said control valve is configured so that it is switched depending on a ground level.

6. A hydraulic system as defined in claim 5; and further comprising at least one probe which senses the ground level and generates at least one distance signal depending on the ground level and transmits the at least one distance signal; and a control unit to which the at least one distance signal is transmitted.

7. A hydraulic system as defined in claim 6, wherein said control unit is configured so that it generates signals depending on the distance signals and transmits the generated signals to the control valve.

8. A hydraulic system as defined in claim 4, wherein said at least one control valve is configured as a poppet valve.

9. A hydraulic system as defined in claim 1; and further comprising a pressure control valve located between at least one of the consumers and said common hydraulic pressure line.

10. A hydraulic system as defined in claim 4, wherein said control valve is integrated in said common hydraulic pressure line near an associated one of said consumers on the carrier vehicle or a front attachment.

11. A hydraulic system as defined in claim 4, wherein some of said consumers are hydraulic cylinders configured for a pressure range.

12. A hydraulic system as defined in claim 1, wherein said pressure-controlled, variable-displacement pump is configured with an adjustable pump capacity which is controllable depending on a pressure at an inlet side of said common hydraulic pressure line or depending on an electrical control device.

13. A hydraulic system as defined in claim 1, wherein said variable-displacement pump is driven by an internal combustion engine and is depressurized when the internal combustion engine is started.

14. A hydraulic system as defined in claim 13; and further comprising an electrically controllable switching valve which is assigned to said variable-displacement pump and, after the internal combustion engine is started up, is controlled such that said variable-displacement pump generates the hydraulic pressure in said common hydraulic pressure line.

15. A hydraulic system as defined in claim 1; and further comprising at least one variator provided in the agricultural working machine and configured so that a reduction ratio of said variator is adjustable using the consumer.

16. A hydraulic system as defined in claim 1; and further comprising an emergency control pump assigned to the agricultural working machine and configured so that said emergency control pump locks in an "out-of-service" position when a working pressure is applied and is switched into an "in-service" position when the working pressure drops.

17. A hydraulic system as defined in claim 16, wherein said emergency control pump has a piston in which the "in-service" position is operatively connected with a wheel-driven cam so that a rotary motion of the cam induces pumping action of said emergency control pump.

18. A hydraulic system as defined in claim 1; and further comprising at least one hydraulic motor located in said common hydraulic pressure line and driving a blower in a rotary manner.

* * * * *